United States Patent
Cook (10) Patent No.: US 8,824,532 B2
(45) Date of Patent: Sep. 2, 2014

(54) METHOD AND APPARATUS TO GENERATE WIRELESS TEST SIGNALS

(75) Inventor: Jonathan Cook, Los Gatos, CA (US)

(73) Assignee: Apple Inc., Cupertino, CA (US)

(*) Notice: Subject to any disclaimer, the term of this patent is extended or adjusted under 35 U.S.C. 154(b) by 902 days.

(21) Appl. No.: 12/773,698

(22) Filed: May 4, 2010

(65) Prior Publication Data
US 2011/0217937 A1 Sep. 8, 2011

Related U.S. Application Data

(60) Provisional application No. 61/310,608, filed on Mar. 4, 2010.

(51) Int. Cl.
*H04B 3/46* (2006.01)
*H04B 17/00* (2006.01)
*H04Q 1/20* (2006.01)

(52) U.S. Cl.
USPC ........ 375/224; 375/227; 370/241; 455/67.11; 455/67.7; 455/115.1; 455/226.1; 702/79

(58) Field of Classification Search
None
See application file for complete search history.

(56) References Cited

U.S. PATENT DOCUMENTS

| | | | |
|---|---|---|---|
| 6,272,450 B1 | 8/2001 | Hill et al. | |
| 6,405,147 B1* | 6/2002 | Fera | 702/112 |
| 6,466,767 B1 | 10/2002 | Lidbrink et al. | |
| 6,665,288 B1* | 12/2003 | Ottosson et al. | 370/342 |
| 6,993,069 B1 | 1/2006 | Donati et al. | |
| 7,336,701 B2* | 2/2008 | Kearney et al. | 375/224 |
| 7,403,559 B1* | 7/2008 | Fisher et al. | 375/150 |
| 7,463,733 B2* | 12/2008 | Watkinson | 379/416 |
| 2004/0266423 A1* | 12/2004 | Morikawa et al. | 455/424 |
| 2007/0077890 A1 | 4/2007 | Drabeck et al. | |
| 2008/0123756 A1* | 5/2008 | Daniels et al. | 375/260 |
| 2008/0220777 A1 | 9/2008 | Kouadjo et al. | |
| 2008/0291049 A1* | 11/2008 | Meek | 340/870.03 |

OTHER PUBLICATIONS

Digital Cellular Telecommunications System (Phase 2+); Radio Transmission and reception (3GPP TS 45.005 version 6.9.0 Release 6), ETSI TS 145 005 v. 6.9.0, Apr. 2005.
Data Sheet, Spirent Wireless Channel Emulator, SR5500, http://www.spirent.com/Solutions-Directory/~/media/Datasheets/Mobile/SR5500_Data_Sheet.ashx, , Jan. 2010.
Data Sheet, Spirent Wireless Channel Emulator, SR5500, Dec. 2007.
Multi-Channel TRAU Tx/Rx Emulation and Analysis (Client-Server Based), GL Communications, http://www.gl.com/trauterr.html, pp. 1-6.

* cited by examiner

*Primary Examiner* — Shuwang Liu
*Assistant Examiner* — Gina McKie
(74) *Attorney, Agent, or Firm* — Womble Carlyle Sandridge & Rice LLP (57) ABSTRACT

A method of generating a noisy receive signal for testing the performance of a mobile wireless communication device is described. A signal generator unit generates a transmit signal that frequency hops among a set of carrier frequency channels in a cyclic pattern having a time duration T. A wireless channel emulator unit generates a receive signal by modifying the transmit signal and also generates an interference signal by modifying the receive signal. The wireless channel emulator unit delays the interference signal relative to the receive signal by an integer multiple of the time duration T. The receive signal and the interference signal are combined by a combiner unit to generate the noisy receive signal.

24 Claims, 10 Drawing Sheets

METHOD AND APPARATUS TO GENERATE WIRELESS TEST SIGNALS

CROSS REFERENCE TO RELATED APPLICATIONS

This patent application claims priority under 35 U.S.C. 119(e) to U.S. Provisional Application No. 61/310,608 entitled WIRELESS INTERFERENCE by Jonathan Cook, filed Mar. 4, 2010 which is incorporated by reference in its entirety for all purposes.

TECHNICAL FIELD

The described embodiments relate generally to wireless mobile communications. More particularly, a method and apparatus is described for generating wireless signals for testing a mobile wireless communication device.

BACKGROUND OF THE INVENTION

Mobile wireless communication devices, such as a cellular telephone or a wireless personal digital assistant, can provide a wide variety of communication services including, for example, voice communication, text messaging, internet browsing, and electronic mail. Mobile wireless communication devices can operate in a wireless communication network of overlapping "cells", each cell providing a geographic area of wireless signal coverage that extends outward from a base transceiver station (BTS). Whether idle or actively connected, a mobile wireless communication device can be associated with a "serving" cell in a wireless communication network and be aware of neighboring cells to which the mobile wireless communication device can also associate. The quality of a communication link between the mobile wireless communication device and the BTS can vary based on the distance between them and on interference included in signals received at either end of the communication link. BTS in nearby neighbor cells can transmit in a range of radio frequency spectrum that overlaps with the transmit spectrum of the BTS in the serving cell, and mobile wireless communication devices in the serving cell can receive transmissions from a BTS in a neighbor cell as interference.

To avoid interference on a particular carrier frequency, a mobile wireless communication device can frequency hop among several different frequencies across a range of radio frequency spectrum. Transmissions from several different neighbor cell BTS can combine as a set of multiple interferers received at the mobile wireless communication device. As each BTS can transmit on multiple carrier frequencies, the combined interference from the several neighbor cell BTS can affect many if not all of the frequency hopping carrier frequencies received by the wireless communication device in the serving cell. In order to emulate a multiple interferer transmission for mobile wireless communication devices in a laboratory environment, typically a separate unit of test equipment, such as a signal generator, can be used to simulate transmissions for each BTS in a neighbor cell. Such a test configuration can be bulky and costly. Thus there exists a need for a method to emulate wireless interference from multiple BTS using minimal equipment.

SUMMARY OF THE DESCRIBED EMBODIMENTS

This paper describes various embodiments that relate to methods and apparatus to emulate multiple radio frequency interferers received at a wireless mobile communication device. In one embodiment, a method is described. The method can be performed by carrying out at least the following operations. Generating a transmit signal having at least one transmit signal frequency and generating a first copy and a second copy of the transmit signal. The first copy and the second copy of the transmit signal are modified to provide a receive signal and an interference signal, respectively. The receive signal and the interference signals are combined to provide a noisy receive signal that can be used to test a mobile wireless communication device.

In one aspect, the transmit signal hops among a set of carrier frequency channels in a cyclic pattern having a time duration T whereas the interference signal is delayed relative to the receive signal by an integer multiple of the time duration T In another embodiment, an apparatus for testing the performance of a mobile wireless communication device is described. The apparatus includes at least a signal generator unit arranged to provide a transmit signal that frequency hops among a set of carrier frequency channels in a cyclic pattern having a time duration T, a wireless channel emulator unit coupled to the signal generator unit arranged to modify a first copy of the transmit signal to provide a receive signal and to modify a second copy of the transmit signal to generate an interference signal that is delayed relative to the receive signal by an integer multiple of the time duration T, a combiner coupled to the wireless channel emulator arranged to combine the receive signal and the interference signal to generate the noisy receive signal, and a transmitter arranged to wirelessly transmit the noisy receive signal.

In still another embodiment, computer program product encoded in a tangible computer readable medium for testing a mobile wireless communication device is described. The computer readable medium includes at least computer code for generating a transmit signal having a transmit signal frequency, computer code for generating a first copy and a second copy of the transmit signal, computer code for modifying the first copy and the second copy to provide a receive signal and an interference signal, respectively, computer code for combining the receive signal and the interference signal to provide a noisy receive signal, and computer code for using the noisy receive signal to test a mobile wireless communication device.

In yet another embodiment, an apparatus for testing the performance of a mobile wireless communication device is disclosed. The apparatus includes at least a signal generator unit arranged to provide a transmit signal that frequency hops among a set of carrier frequency channels in a cyclic pattern having a time duration T, a wireless channel emulator unit coupled to the signal generator unit arranged to modify the transmit signal to provide a receive signal and to modify the receive signal to generate an interference signal that is delayed relative to the receive signal by an integer multiple of the time duration T, a combiner coupled to the wireless channel emulator arranged to combine the receive signal and the interference signal to generate the noisy receive signal, and a transmitter arranged to wirelessly transmit the noisy receive signal.

BRIEF DESCRIPTION OF THE DRAWINGS

The invention and the advantages thereof may best be understood by reference to the following description taken in conjunction with the accompanying drawings.

DETAILED DESCRIPTION OF EXAMPLE EMBODIMENTS

In the following description, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

Figure 1:
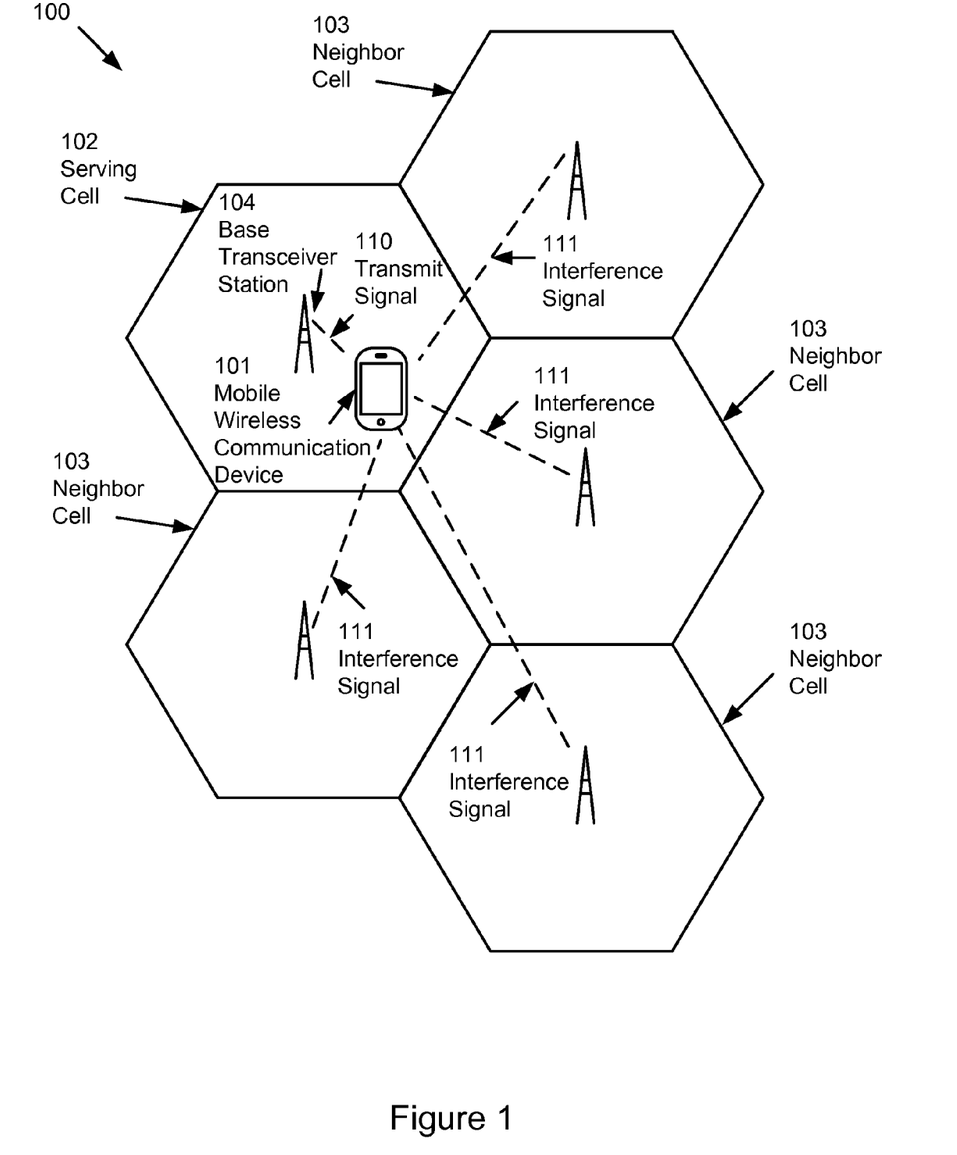
FIG. 1 illustrates a mobile wireless communication device located within a wireless cellular communication network.

A mobile wireless communication device 101 can include the capability to connect seamlessly with a wireless communication network 100 of overlapping wireless communication cells, each wireless communication cell covering a geographic area extending from a base transceiver station (BTS) as illustrated in FIG. 1. The mobile wireless communication device 101 can receive a primary transmit signal 110 from a BTS 104 in a serving cell 102 in the wireless communication network 100. The mobile wireless communication device 101 can also receive one or more secondary interference signals 111 from BTS in multiple neighbor cells 103 that surround the serving cell 102. In order to increase geographic coverage by the wireless communication network 100, the serving cell and neighbor cells can substantially overlap in geographic area served by each cell. (Although FIG. 1 illustrates the cells as distinct hexagons, in actual fact the cells can be circular or other shapes that substantially overlap one another.) Network planning rules and frequency agile communication protocols used by the different BTS can seek to minimize interference between transmissions sharing the same range of radio frequency spectrum; however, some interference can still occur. In particular, a BTS in a neighbor cell 103 can transmit in the same frequency band in which a mobile wireless communication device 101 receives transmissions from the BTS 104 of an associated serving cell 102.

Interference transmissions from neighbor BTS in a wireless communication network 100 can differ from other sources of noise such as additive white Gaussian noise (AWGN). AWGN can be modeled as a purely random sequence of symbols, while interference transmissions from a neighbor BTS can include non-random sequences, such as a regularly repeated fixed pattern of symbols known as a training sequence code (TSC) embedded in each transmission burst output by the neighbor BTS. In some scenarios, the neighbor cell 103 BTS can transmit using the same TSC as the serving cell BTS 104. Such a non-random interference signal 111 can be a primary source of interference affecting performance of signal reception in a mobile wireless communication device 101.

Figure 2:
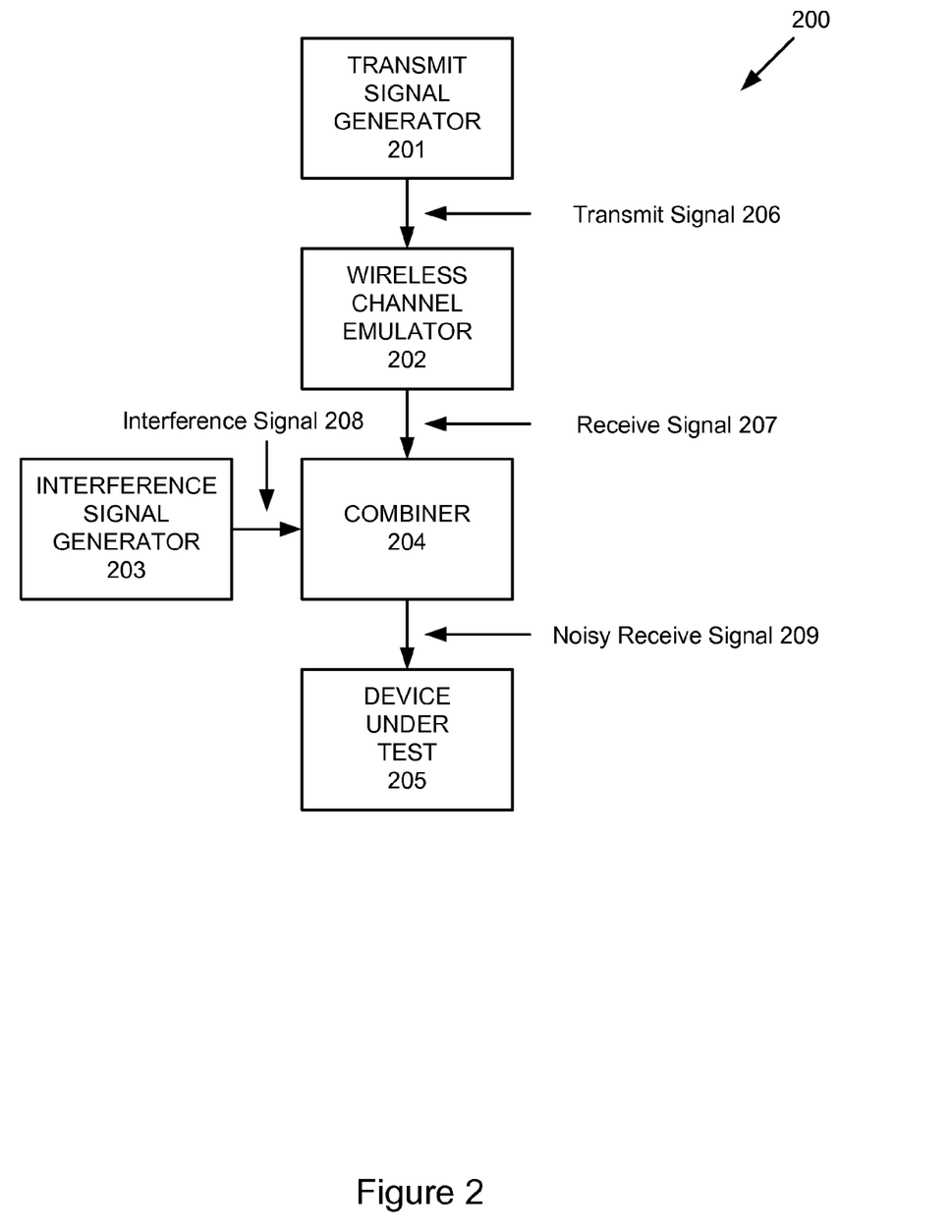
FIG. 2 illustrates an apparatus for testing radio frequency interference in a wireless cellular communication network.

To model a non-random interference signal 111 in a test laboratory environment, a test apparatus 200 can include several operational units joined together as shown in FIG. 2. A transmit signal generator 201 can output a transmit signal 206 that can represent transmit signal 110 sent by the BTS 104 in the serving cell 102 to the mobile wireless communication device 101. As the transmit signal 110 propagates across the geographic distance in the serving cell 102 between the BTS 104 and the mobile wireless communication device 101, the transmit signal 110 can be attenuated in signal strength and altered by time-varying frequency shifts and phase shifts. In addition, multiple copies of the transmit signal 110 can be received at the mobile wireless communication device 101, each received copy of the transmit signal 110 altered by a different attenuation and incurring a different time delay due to traversing a different path between the BTS 104 and the mobile wireless communication device 101. Delayed transmit signals can incur a phase shift that when combined with direct "line of sight" transmit signals result in destructive interference known as "fading." Different fading models, such as Rayleigh and Rician, can be simulated using test equipment such as a wireless channel emulator 202. The "multi-path" interference can be realistically simulated, controllably and repeatedly, using the wireless channel emulator 202, which outputs a receive signal 207 that includes effects of multi-path fading, Doppler shift, phase shift, frequency shift and other forms of real-time fading for mobile wireless communication systems applied to the transmit signal 206.

The wireless channel emulator 202 can also include a noise module that simulates AWGN; however, these noise modules cannot simulate non-random noise that can result from neighbor cell 103 BTS signal interference 111. Instead, a separate interference signal generator 203 can output an interference signal 208 that models at least one of the interference signals 111 from neighbor cell 103 BTS as would be received at the mobile wireless communication device 101 operating in the serving cell 102 of the wireless communication network 100. A combiner 204 can add the interference signal 208 to the receive signal 207 to output a noisy receive signal 209 that can represent a transmit signal 206 altered by both a multi-path fading communication channel between a BTS and the mobile wireless communication device and by additive interference from one or more BTS in neighbor cells. The noisy receive signal 209 can be input to a device under test 205, which can be a representative sample of the mobile wireless communication device 101, to assess mobile wireless communication performance in the wireless communication network 100.

While the test apparatus shown in FIG. 2 can model interference received from a single interfering BTS from a single specific neighbor cell 103, the mobile wireless communication device 101 can also receive interfering signals from other BTS in different neighbor cells 103. Each BTS can possibly transmit on a different carrier frequency and also use a different accompanying repeated transmission sequence code. As the number of overlapping cells used in a wireless communication network increases, the number of interferers can also increase, resulting in a received interference signal at the mobile wireless communication device 101 that spans a range of frequency spectrum with multiple embedded TSCs on each carrier frequency within the frequency range. As shown by the transmission format diagram 300 in FIG. 3A, the transmit signal 110 generated by the BTS 104 of the serving cell 102 can be organized as a sequence of frames, each frame divided into multiple individual time slots. In a representative embodiment, the transmit signal 110 can include frames spanning 4.615 ms, each frame including 8 distinct time slots. When actively connected to the BTS 104 in the serving cell 102, the mobile wireless communication device can be assigned a particular time slot on which to receive transmissions in each frame of the transmit signal 110. By dividing the transmit signal 110 into multiple timeslots, multiple wireless communication devices can be connected simultaneously to the BTS 104 of the serving cell 102, with each wireless communication device assigned a different time slot when actively connected. Such a wireless communication method can be known as "time division multiple access" (TDMA). A time slot within a frame of the transmit signal 110 can contain a burst transmission that occupies a relatively narrow band of radio frequencies centered about a particular radio frequency known as a carrier frequency. This relatively narrow band of radio frequencies about the carrier frequency can be referred to by a radio frequency channel number, with a range of radio frequency spectrum thus divided into multiple parallel communication channels each centered at a different carrier frequency. This "frequency division" of the radio frequency spectrum can be used in combination with the "time division" arrangement shown in FIG. 3A.

Figure 3A:
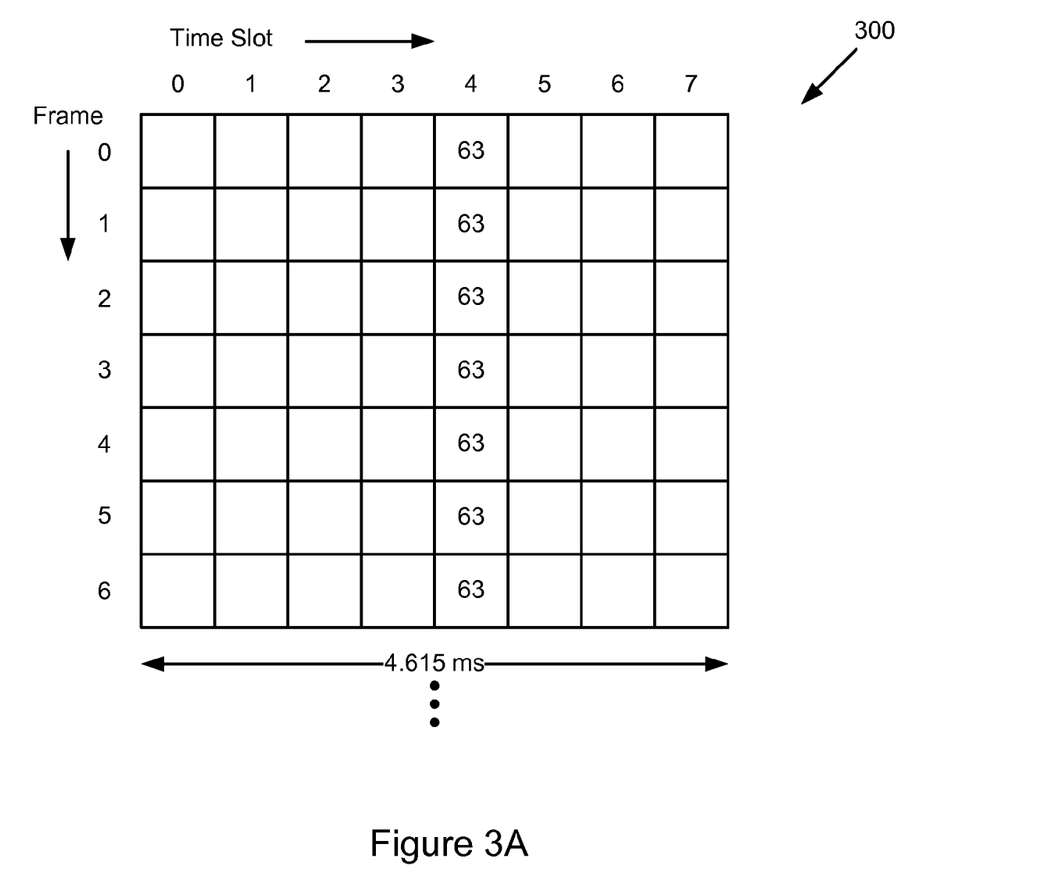
FIG. 3A illustrates a representative time slotted transmission format using a single frequency on a time slot for a wireless cellular communication network.
Figure 4:
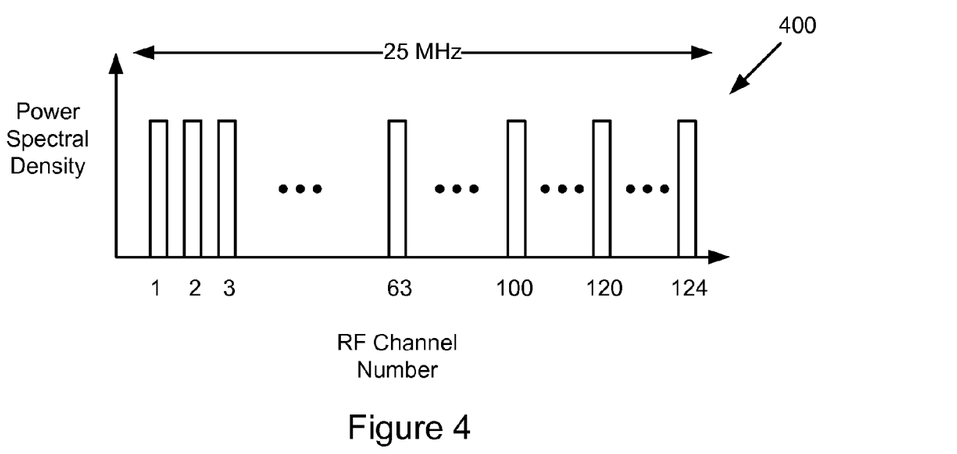
FIG. 4 illustrates a representative multiple carrier frequency spectrum for a wireless cellular communication network.

For example, as shown in FIG. 3A, on time slot 4 of every frame, a burst transmission can occur on radio frequency channel 63, while on time slot 2, transmissions can occur on radio frequency channel 120. The mobile wireless communication device 101, when assigned by the BTS 104 in the serving cell 102 to time slot 4, can know that transmit signals from the BTS 104 can be use the particular radio frequency channel 63 in each frame. FIG. 4 illustrates a representative band of radio frequency spectrum spanning a bandwidth of 25 MHz divided into 124 parallel radio frequency channels, each radio frequency channel spanning approximately 200 kHz of bandwidth and having been assigned a different radio frequency channel number. In a representative Global System for Communications (GSM) communications network commonly referred to as GSM-900, for example, the 25 MHz band of 124 parallel channels can span radio frequencies between 935 to 960 MHz in the downlink direction (BTS to mobile device) and 890 to 915 MHz in the uplink direction (mobile device to BTS). Radio frequency channel number 1 can refer to a frequency of 935.2 MHz in the downlink direction and to a frequency of 890.2 MHz in the uplink direction. Other representative GSM frequency bands are described in the ETSI technical specification 3GPP TS 45.005 incorporated by reference in its entirety for all purposes.

Figure 3B:
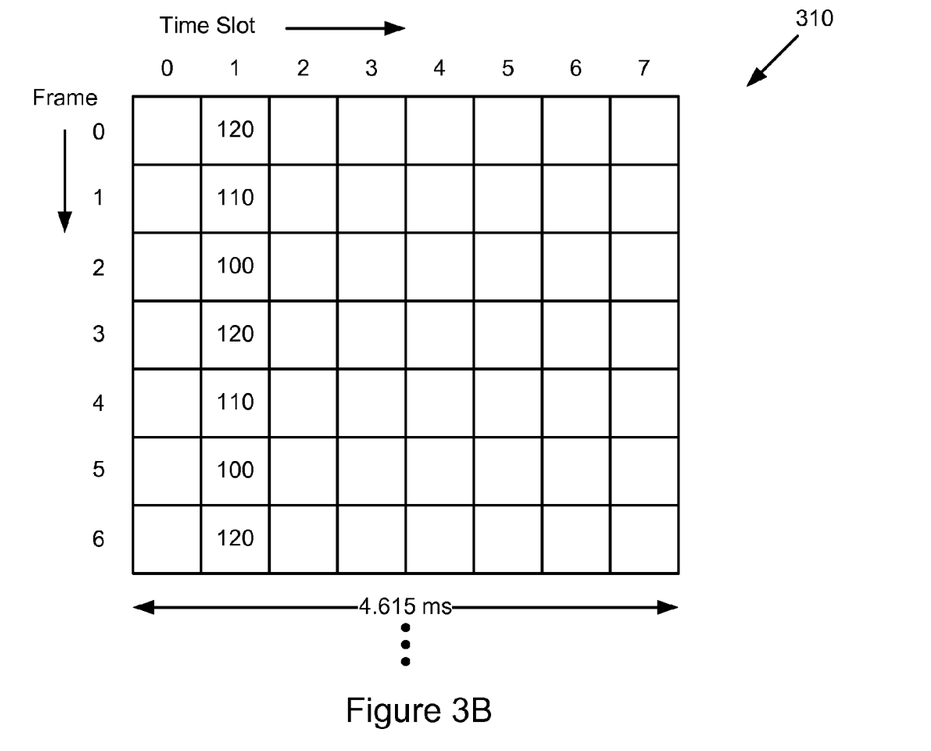
FIG. 3B illustrates a representative time slotted transmission format using multiple frequencies on a time slot for a wireless cellular communication network.

Transmissions that use only a single frequency channel, such as shown by time slot 4 in FIG. 3A using only frequency channel number 63 in each frame of the transmit signal, can be vulnerable to performance degradation when the mobile wireless communication device 101 receives interference signals that occupy the same frequency channel. To avoid continuous interference at a particular frequency channel, the BTS 104 can instead output a transmit signal 110 that frequency hops among several different frequency channels, each centered about a different frequency such as shown by transmissions in time slot 1 of FIG. 3B. A set of three different frequency channels 100, 110, and 120 can be used individually in different frames of the transmit signal 110. Frequency hopping among a set of frequency channels with different frequency channel numbers can proceed according to a pseudo-random pattern (not shown) or by using a cyclic repeated pattern of frequency channel numbers (e.g. 120, 110, 100, 120, 110, 100, . . . as shown). Frequency agile transmit signals that frequency hop among a broad range of frequency spectrum can be less vulnerable to single frequency channel interferers, such as from a single BTS in a neighboring cell. Frequency hopping transmit signals, however, can be vulnerable to multiple frequency interferers produced by one or more different BTS in neighbor cells, where each BTS can transmit on different frequency channels or frequency hop among a range of frequencies that overlap with the frequency range used by the BTS in the serving cell. Interference signal generators 203 can typically be configured to generate transmit signals for a single frequency channel but not to generate transmit signals that frequency hop among multiple frequency channels. Thus multiple interference signal generators can be required to emulate a multiple interferer environment.

Figure 5:
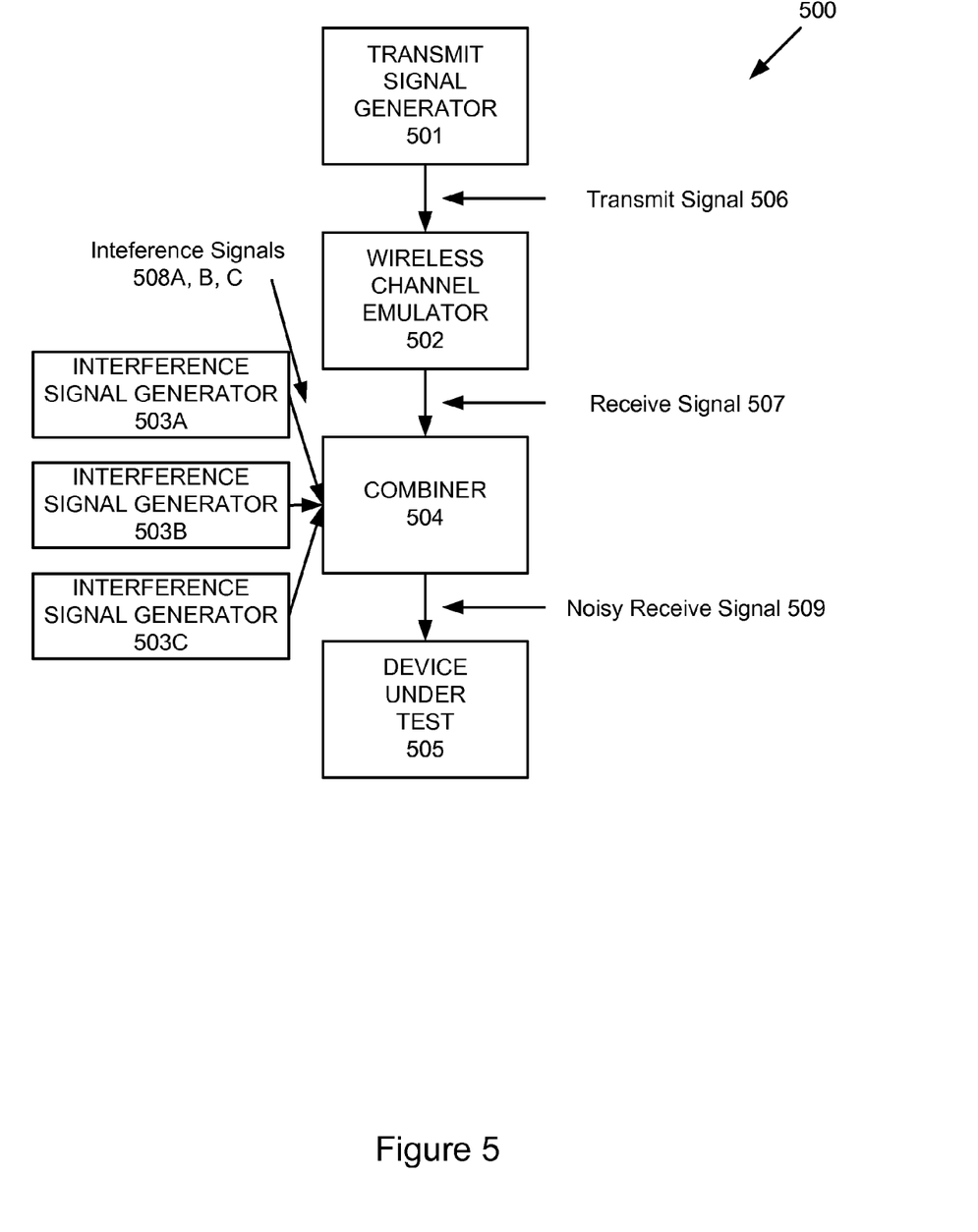
FIG. 5 illustrates an apparatus for testing radio frequency interference from multiple interferers in a wireless cellular communication network.

FIG. 5 illustrates a test apparatus 500 that can simulate multiple interfering signals that simultaneously affect the performance of a mobile wireless communication device. A transmit signal generator 501 can output a transmit signal 506 which can be altered by a wireless channel emulator 502 that simulates a multi-path fading communication channel. The resulting receive signal 507 can be added together by a combiner 504 with interference signals 508A, B, and C output from interference signal generators 503 A, B, and C respectively. Each interference signal generator 503 A, B and C can output different interference signals 508 A, B and C that each represents transmissions from different BTS in different neighbor cells. The transmit signal can, for example frequency hop among three different frequency channels, while the interference signals 508 A, B and C can simulate transmissions by three BTS in three different neighbor cells, each BTS using one of the three different frequency channels. The noisy receive signal 509 can then be input to a representative mobile wireless communication device under test 505. Increasing the number of interferers to simulate, reflecting a number of frequency channels among which to hop, can also increase the number of interference signal generators required to model different multiple interferer scenarios. For example, a mobile wireless communication device can frequency hop among 20 different frequency channels, and thus 20 interference signal generators can be required to test the simultaneous reception of interference from 20 different BTS, each BTS transmitting on a different frequency channel. As each interference signal generator can be costly, an alternative test apparatus to simulate multiple interferers can be desired.

Figure 6:
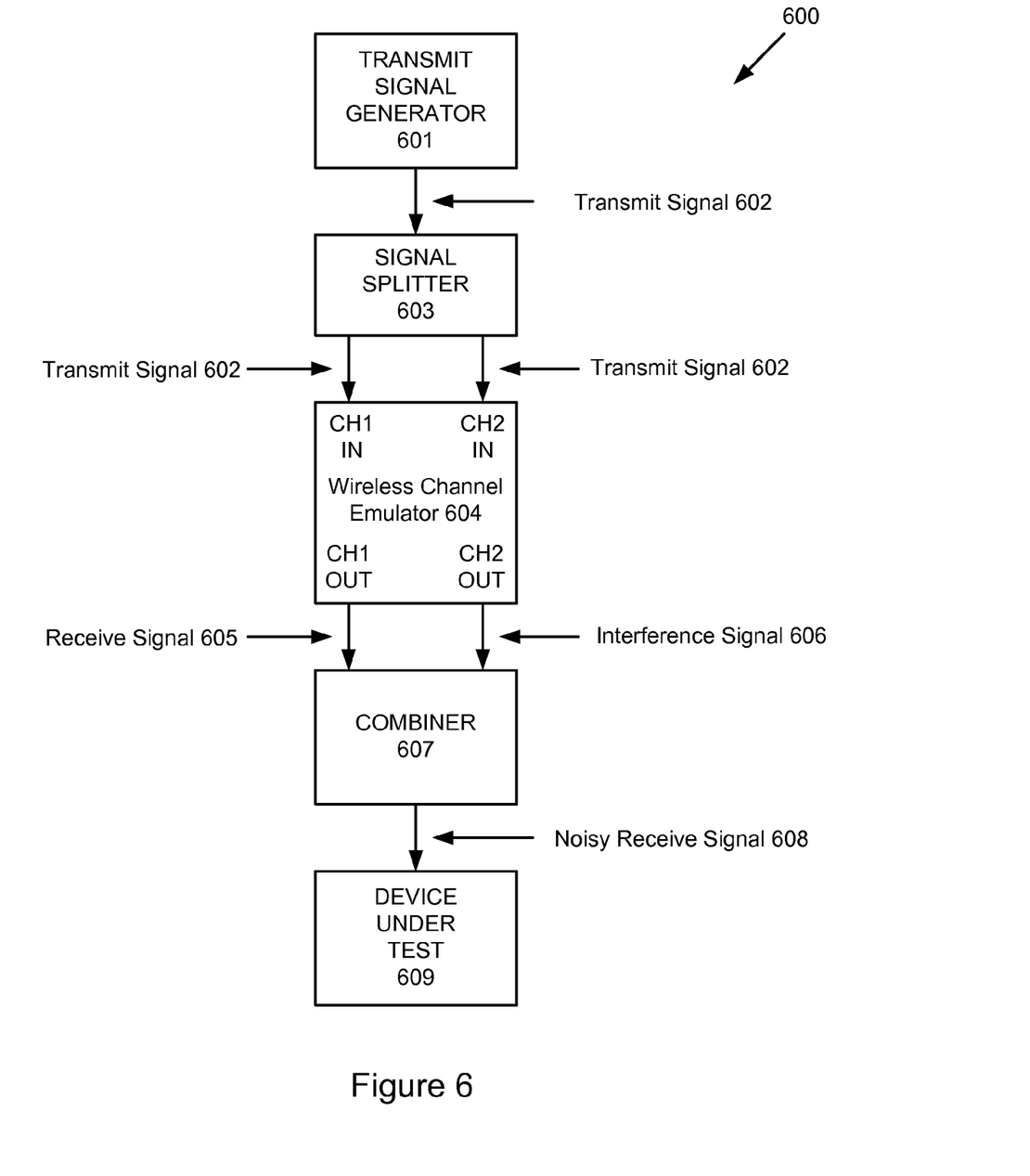
FIG. 6 illustrates a representative apparatus for testing radio frequency interference with minimal signal generators in a wireless cellular communication network.

FIG. 6 illustrates a representative test apparatus 600 without interference signal generators to simulate a mobile wireless communication device receiving interference from multiple interferers. A transmit signal generator 601 can output a transmit signal 602 that frequency hops among several different frequency channels using a different frequency channel in each successive frame of a multiple frame transmission sequence. A signal splitter 603 can duplicate the transmit signal 602, and the transmit signal 602 can be input simultaneously to two different ports of a wireless channel emulator 604. Representative wireless channel emulators 604, as shown in FIG. 6, can include parallel communication paths between two input ports (labeled CH1 IN, CH2 IN) and two output ports (labeled CH1 OUT, CH2 OUT). The wireless channel emulator 604 can be configured to output from the CH1 OUT output port a receive signal 605 that represents the transmit signal 602 input to the CH1 IN input port altered by a wireless communication channel from a BTS to a mobile wireless communication device. The wireless communication channel can include multi-path fading as described earlier. If the transmit signal 602 frequency hops using a particular frequency hopping pattern, then the receive signal 605 can also frequency hop using the same frequency hopping pattern. By simulating a second wireless communication path, the wireless channel emulator 604 can output an interference signal 606 on the CH2 OUT output port generated from the same transmit signal 602 input to the CH2 IN input port. By configuring the wireless channel emulator 604, the interference signal 606 can incur the same multi-path fading as the receive signal 605, or a different multi-path fading if desired (or even none at all). In addition the wireless channel emulator 604 can attenuate the transmit signal 602 input to the CH2 IN input port to scale the resulting interference signal 606 to a desired average interference power level. The combiner 607 can then output a noisy receive signal 608 that adds together the receive signal 605 to the interference signal 606. Independent amplitude scaling of the receive signal 605 and interference signal 606 by the wireless channel emulator 604 can produce a desired signal carrier power to interference power ratio (which can be referred to as a C/I ratio). The noisy receive signal 608 as generated by the apparatus 600 in FIG. 6 can represent a form of "self" interference.

Figure 8:
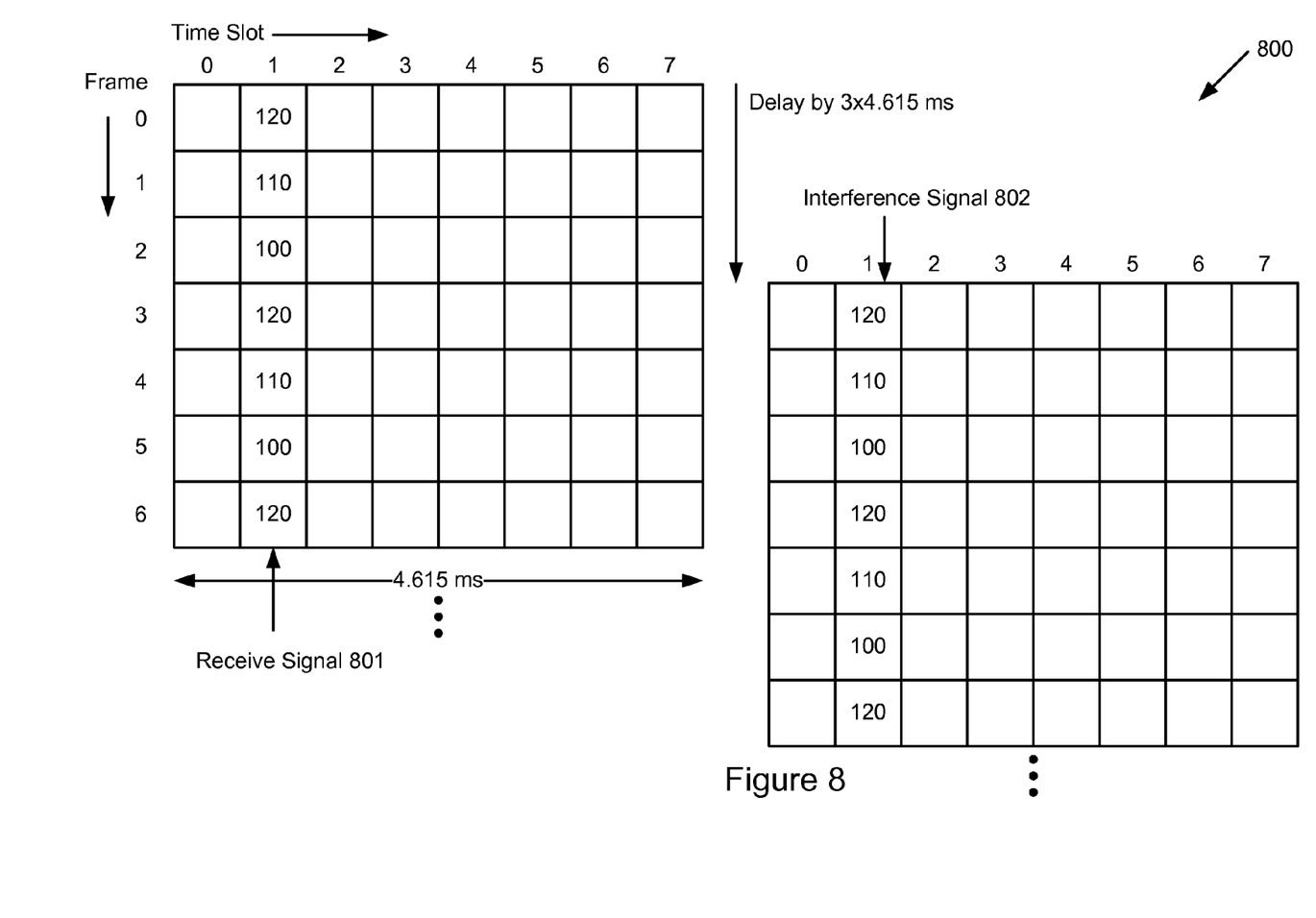
FIG. 8 illustrates a time delay relationship between a receive signal and an interference signal in a wireless cellular communication network.

If the transmit signal 602 uses a cyclic frequency hopping pattern that repeats every N frames, then the wireless channel emulator 604 can delay the transmit signal 602 input to the CH2 IN input port by an integer multiple of N frames resulting in an interference signal 606 that also frequency hops with the same cyclic frequency hopping pattern as the receive signal 605. The delayed interference signal 606 can be added together with the receive signal 605 by the combiner 607 resulting in the noisy receive signal 608 that is more random than without the additional multi-frame delay. Constituent parts of the noisy receive signal 608 in a particular frame can originate from two different frames in the transmit signal 602, one frame from the receive signal 605 and a different delayed frame from the interference signal 606. As a representative example, FIG. 8 illustrates a receive signal 801 having a cyclic frequency hopping pattern that repeats every three frames on time slot 1. An interference signal 802 can be generated with a time delay of 3 frames, each frame spanning 4.615 ms, (or more generally with a time delay of an integer multiple of 3 frames), resulting in an interference signal 802 that frequency hops with the same pattern as the receive signal 801. A noisy receive signal can be a combination of the receive signal 801 plus the interference signal 802.

Figure 7:
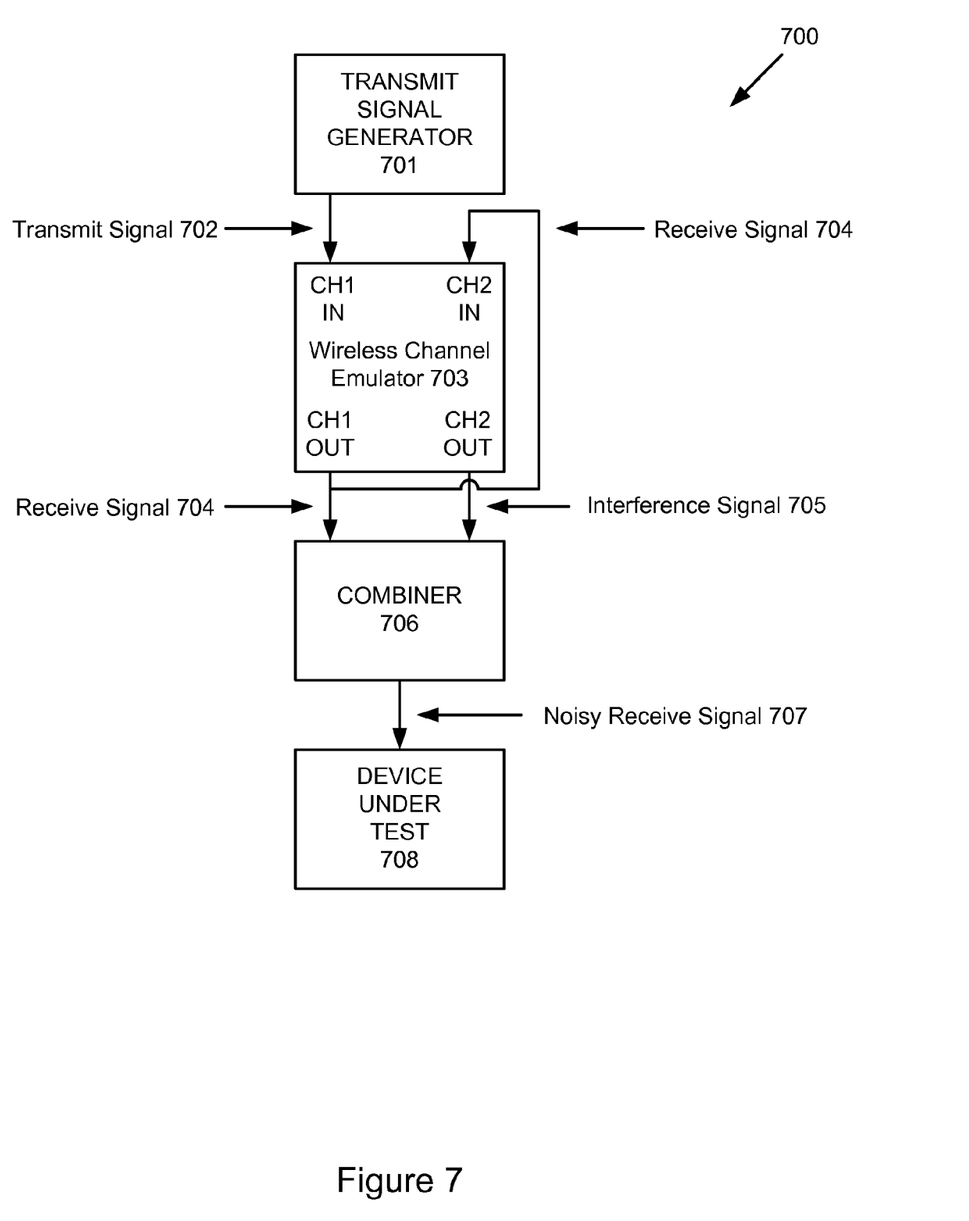
FIG. 7 illustrates a second representative apparatus for testing radio frequency interference with minimal signal generators in a wireless cellular communication network.

FIG. 7 illustrates a second representative embodiment of a test apparatus 700 that can simulate a frequency hopping interference signal without an interference signal generator. A transmit signal generator 701 outputs a transmit signal 702 that can frequency hop among multiple frequency channels in a given time slot on each successive frame. A wireless channel emulator 703 can simulate an attenuating and fading multi-path transmission channel and output a receive signal 704 from an output port CH1 OUT based on the transmit signal 702 input to the input port CH1 IN. The receive signal 704 can be input to a second input port CH2 IN of the wireless channel emulator 703, which can simulate a second transmission channel that can include one or more transmission characteristics including delay, attenuation and additional fading. The wireless channel emulator 703 can output an interference signal 705 from a second output port CH2 OUT based on the receive signal 704 input to the second input port CH2 IN. The receive signal 704 and the interference signal 705 can be added together by a combiner 706 producing a noisy receive signal 707 that can be used to evaluate the performance of a mobile wireless communication device under test 708. If the transmit signal 702 hops among a set of frequency channels using a cyclic pattern that spans N frames, then the receive signal can also frequency hop with the same pattern. The interference signal 705 can also frequency hop with the same pattern if the delay applied by the wireless channel emulator 703 to the receive signal 704 simulating the second transmission channel includes a delay equal to an integer multiple of N frames.

While FIG. 6 illustrates a signal splitter 603 generating a duplicate transmit signal 602 external to the wireless channel emulator 604, in some embodiments the signal splitting function can be accomplished inside the wireless channel emulator 604. Similarly, the connection of the receive signal 704 in FIG. 7 output from the CH1 OUT output port to the CH2 IN input port can also be implemented inside the wireless channel emulator 703 with appropriate circuitry.

Figure 9:
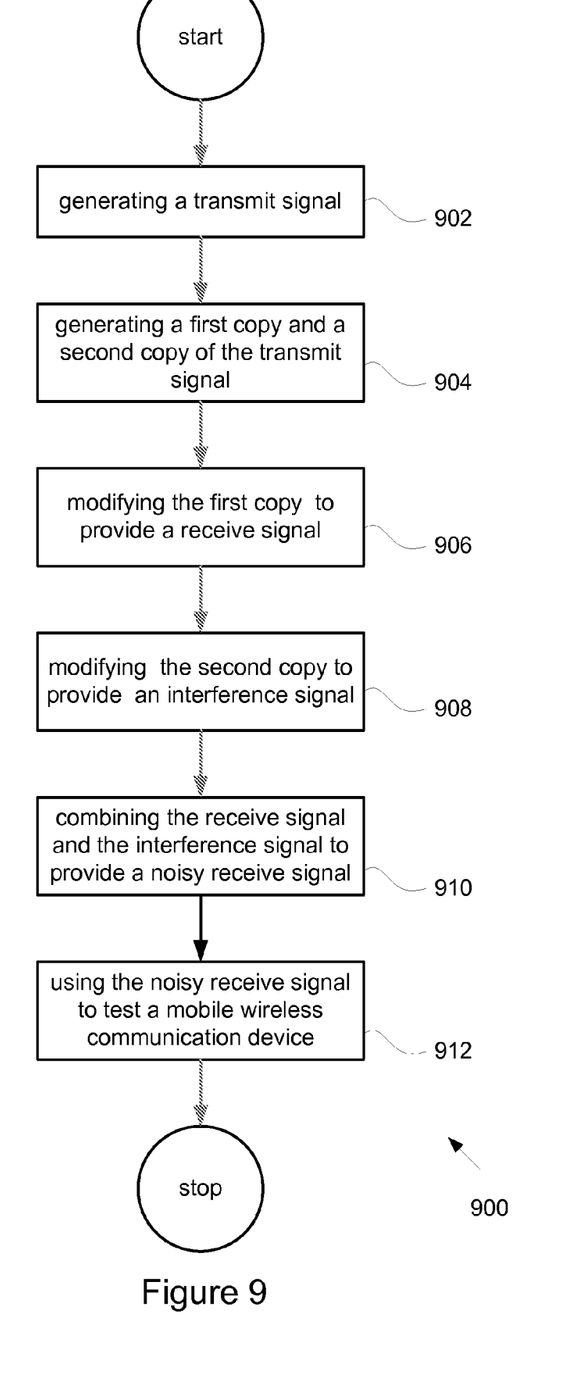
FIG. 9 shows a flowchart detailing a process in accordance with the described embodiments.

FIG. 9 shows a flowchart detailing process 900 in accordance with the described embodiments. Process 900 can be carried out by performing at least the following operations. At 902, a transmit signal is generated and at 904 a first and a second copy of the transmit signal is provided. At 906, the first copy of the transmit signal is modified to provide a receive signal while at 908 the second copy of the transmit signal is modified to provide an interference signal. At 910, the receive and interferences signals are combines to provide a noisy receive signal suitable for being used to test a mobile wireless communication device at 912.

Figure 10:
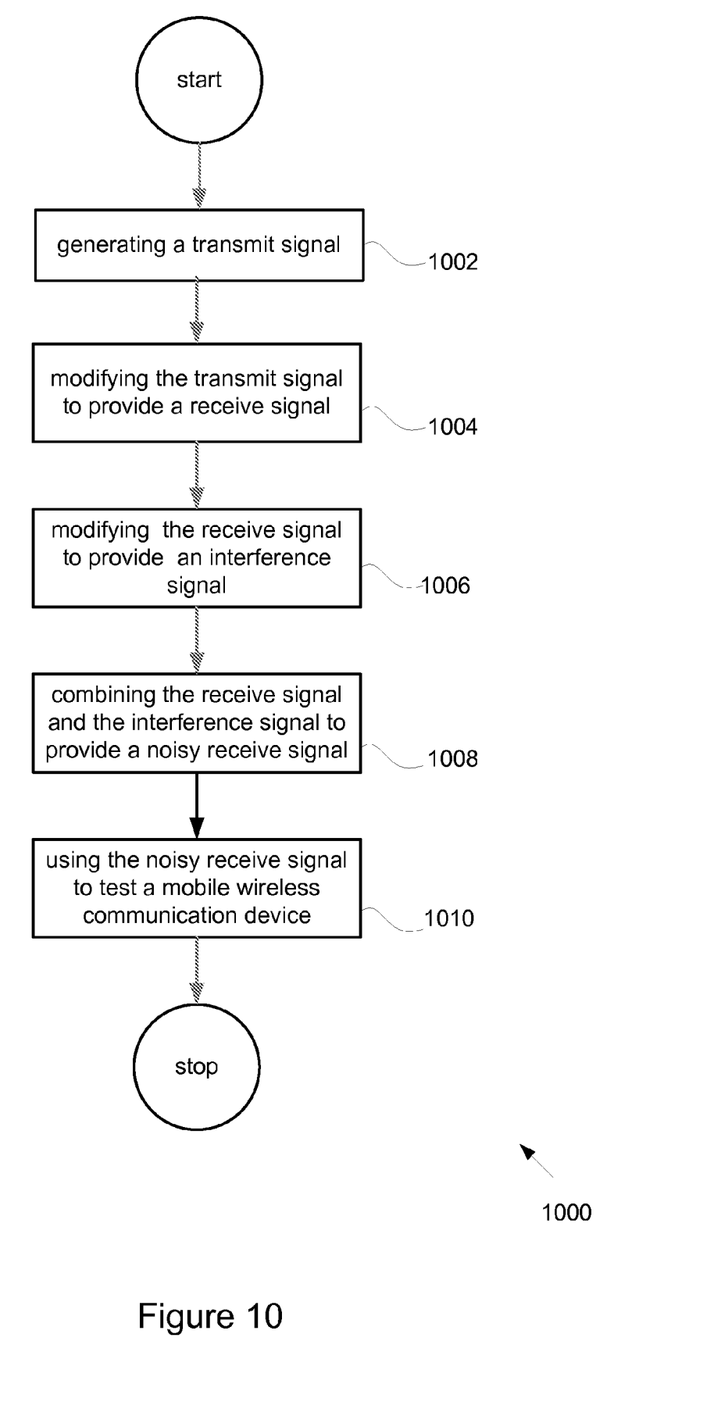
FIG. 10 shows a flowchart detailing a process in accordance with the described embodiments.

FIG. 10 shows a flowchart detailing process 1000 in accordance with the described embodiments. Process 1000 can begin at 1002 by generating a transmit signal and at 1004 by modifying the transmit signal to provide a receive signal. At 1006, the receive signal is, in turn, modified to provide an interference signal while at 1008, the receive signal and the interference signal are combined to form a noisy receive signal that can be used at 1010 to test a mobile wireless communication device.

Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line used to fabricate thermoplastic molded parts. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The various aspects, embodiments, implementations or features of the described embodiments can be used separately or in any combination. The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
generating a transmit signal having at least one transmit signal frequency, wherein the transmit signal frequency hops among a plurality of carrier frequency channels in a cyclic pattern having a time duration T;
generating a first copy of the transmit signal and a second copy of the transmit signal;
modifying the first copy of the transmit signal and the second copy of the transmit signal to provide a receive signal and an interference signal, respectively, wherein the interference signal is delayed relative to the receive signal by a non-zero integer multiple of the time duration T;
combining the receive signal and the interference signal to provide a noisy receive signal; and
using the noisy receive signal to test a mobile wireless communication device.

2. The method as recited in claim 1, wherein the receive signal includes random noise.

3. The method as recited in claim 2, wherein the interference signal includes non-random noise that results from a neighbor base transceiver station (BTS).

4. The method as recited in claim 1, wherein each carrier frequency channel in the plurality of carrier frequency channels simulates a single base transceiver station (BTS).

5. The method as recited in claim 1, wherein the noisy receive signal simulates transmissions of a plurality of different base transceiver stations.

6. The method as recited in claim 1, wherein the noisy receive signal simulates effects of real-time fading for the mobile wireless communication device.

7. The method as recited in claim 6, wherein the real time fading includes fading due to at least one of: multi-path fading, Doppler shift, phase shift, and frequency shift.

8. An apparatus for testing the performance of a mobile wireless communication device, the apparatus comprising:
a signal generator arranged to provide a transmit signal that frequency hops among a set of carrier frequency channels in a cyclic pattern having a time duration T;
a wireless channel emulator coupled to the signal generator arranged to modify a first copy of the transmit signal to provide a receive signal and to modify a second copy of the transmit signal to generate an interference signal that is delayed relative to the receive signal by a non-zero integer multiple of the time duration T;
a combiner coupled to the wireless channel emulator arranged to combine the receive signal and the interference signal to generate a noisy receive signal; and
a transmitter arranged to wirelessly transmit the noisy receive signal.

9. The apparatus as recited in claim 8, wherein the noisy receive signal simulates effects of real-time fading for the mobile wireless communication device.

10. The apparatus as recited in claim 8, wherein each carrier frequency channel in the set of carrier frequency channels simulates a single base transceiver station (BTS).

11. The apparatus as recited in claim 8, wherein the noisy receive signal simulates transmissions of a plurality of different base transceiver stations.

12. A non-transitory computer-readable medium encoded with a computer program for testing a mobile wireless communication device, the non-transitory computer-readable medium comprising:
computer code for generating a transmit signal having a transmit signal frequency wherein the transmit signal frequency hops among a plurality of carrier frequency channels in a cyclic pattern having a time duration T;
computer code for generating a first copy of the transmit signal and a second copy of the transmit signal;
computer code for modifying the first copy of the transmit signal and the second copy of the transmit signal to provide a receive signal and an interference signal, respectively, wherein the interference signal is delayed relative to the receive signal by a non-zero integer multiple of the time duration T:
computer code for combining the receive signal and the interference signal to provide a noisy receive signal; and
computer code for using the noisy receive signal to test the mobile wireless communication device.

13. The non-transitory computer-readable medium as recited in claim 12, wherein the noisy receive signal simulates transmissions of a plurality of different base transceiver stations.

14. The non-transitory computer-readable medium as recited in claim 12, wherein each carrier frequency channel in the plurality of carrier frequency channels simulates a single base transceiver station (BTS).

15. A method, comprising:
generating a transmit signal having at least one transmit signal frequency, wherein the transmit signal frequency hops among a plurality of carrier frequency channels in a cyclic pattern having a time duration T;
modifying the transmit signal to provide a receive signal;
modifying the receive signal to provide an interference signal, wherein the interference signal is delayed relative to the receive signal by a non-zero integer multiple of the time duration T;
combining the receive signal and the interference signal to provide a noisy receive signal; and
using the noisy receive signal to test a mobile wireless communication device.

16. The method as recited in claim 15, wherein the receive signal includes random noise.

17. The method as recited in claim 16, wherein the interference signal includes non-random noise that results from a neighbor base transceiver station (BTS).

18. The method as recited in claim 15, wherein each carrier frequency channel in the plurality of carrier frequency channels simulates a single base transceiver station (BTS).

19. The method as recited in claim 15, wherein the noisy receive signal simulates transmissions of a plurality of different base transceiver stations.

20. The method as recited in claim 15, wherein the noisy receive signal simulates effects of real-time fading for the mobile wireless communication device.

21. An apparatus for testing the performance of a mobile wireless communication device, the apparatus comprising:
a signal generator arranged to provide a transmit signal that frequency hops among a set of carrier frequency channels in a cyclic pattern having a time duration T;
a wireless channel emulator coupled to the signal generator arranged to modify the transmit signal to provide a receive signal and to modify the receive signal to generate an interference signal that is delayed relative to the receive signal by a non-zero integer multiple of the time duration T;

a combiner coupled to the wireless channel emulator arranged to combine the receive signal and the interference signal to generate a noisy receive signal; and a transmitter arranged to wirelessly transmit the noisy receive signal.

22. The apparatus as recited in claim 21, wherein the noisy receive signal simulates effects of real-time fading for the mobile wireless communication device.

23. The apparatus as recited in claim 21, wherein each carrier frequency channel in the set of carrier frequency channels simulates a single base transceiver station (BTS).

24. The apparatus as recited in claim 21, wherein the noisy receive signal simulates transmissions of a plurality of different base transceiver stations.

\* \* \* \* \*